United States Patent [19]

Frankel et al.

[11] 4,138,331
[45] Feb. 6, 1979

[54] METHOD OF INCINERATING TOILET WASTES

[75] Inventors: Donald P. Frankel, Lake Geneva, Wis.; Willard E. Kendall, Elgin, Ill.; John F. Cooper, Williams Bay, Wis.

[73] Assignee: Lake Geneva A & C Corporation, Lake Geneva, Wis.

[21] Appl. No.: 806,587

[22] Filed: Jun. 15, 1977

Related U.S. Application Data

[62] Division of Ser. No. 627,756, Oct. 31, 1975, Pat. No. 4,051,561.

[51] Int. Cl.² ............................................. C02B 3/04
[52] U.S. Cl. .................................... 210/63 R; 210/71
[58] Field of Search ...................... 4/131; 110/9 R; 210/63 R, 67, 71, 152

[56] References Cited

U.S. PATENT DOCUMENTS

| 3,742,874 | 7/1973  | Eff ........................................ 4/131 X |
| 3,817,193 | 6/1974  | Frankel et al. ....................... 4/131 X |
| 3,827,378 | 8/1974  | Kufrin et al. ......................... 4/131 X |
| 3,858,251 | 1/1975  | Vollrath et al. ......................... 4/131 |
| 3,911,506 | 10/1975 | West ......................................... 4/131 |
| 3,912,598 | 10/1975 | Dick ......................................... 210/71 |
| 3,956,126 | 5/1976  | Streebin et al. ........................ 210/71 |

*Primary Examiner*—Thomas G. Wyse
*Attorney, Agent, or Firm*—Hill, Gross, Simpson, Van Santen, Steadman, Chiara & Simpson

[57] ABSTRACT

A method of incinerating toilet waste comprising applying combustion heat in substantially the manner of applying heat to the bottom of a cooking pot under and to and through the bottom of a heat permeable upwardly opening receptacle containing the waste and thereby effecting substantial boiling and incineration of the waste, supplying preheated air into the receptacle, and compelling vapor and products of combustion generated by the combustion heat to pass from the receptacle into a combustion zone under the receptacle and through the combustion heat and into an after burner flue leading from the combustion chamber. An aesthetically desirable and sanitary masking foam may be applied to the surface of accumulated toilet waste in the receptacle prior to boiling and incineration.

10 Claims, 11 Drawing Figures

METHOD OF INCINERATING TOILET WASTES

This is a division, of application Ser. No. 627,756, filed Oct. 31, 1975 now U.S. Pat. No. 4,051,561.

This invention relates in general to incinerating toilet wastes, and is more particularly concerned with a new and improved store and burn incinerating toilet method.

Incinerating toilets are desirable for sanitary waste disposal where flush toilet facilities are impractical or at least not as convenient as an incinerating toilet.

Prior incinerating toilets have generally been of the use and burn type. That is, a burn or incinerating cycle has been initiated after each use, involving substantial fuel expenditure to bring the system up to on the order of 1500° F. The burn cycle may involve a 300 to 1 fuel to air ratio requiring on the order of 100,000 btu's just to heat the air. After a burn cycle, the whole system must be cooled down to a safe temperature for reuse of the appliance. This means that a forced circulation blower is required. Odorous remains may be blown to atmosphere by the required large volume of cooling air. In general, fairly complex electrical controls, including interlocks and safety devices are employed in the operation and control of such incinerator toilets.

It will be appreciated that fuel consumption in such prior incinerating toilets is high, because much of the fuel is consumed merely to bring the system up to incineration temperature and to heat the excess air for each burn cycle. When it is considered that a toilet may be used by an average family of four up to 45 times in a 24 hour interval, it will be readily apparent that there is a real problem in relation to fuel consumption. In addition, there is the problem of delay during periods of heavy traffic due to the necessity of cool-down before reuse, or at least very strong cooling draft which may be objectionable to subsequent users. There is generally a time interval of 3 or 4 hours, at least during a 24 hour day wherein the toilet may stand completely idle.

An important object of the present invention is to provide a new and improved method of incinerating toilet wastes, and which will overcome the disadvantages, deficiencies, inefficiencies, shortcomings and problems in prior incinerating toilets and methods.

Another object of the invention is to provide a new and improved greatly simplified method of incinerating toilet water permitting the waste material can be accumulated over an extended period of time and efficiently incinerated in a single incineration cycle.

A further object of the invention is to provide a new and improved low cost, efficient method of handling and incinerating toilet wastes, comprising maintaining the wastes odor free during a storing interval, and then effecting burning with odor free efficiency.

According to features of the invention, there is provided a method of incinerating toilet waste comprising, applying combustion heat in substantially the manner of applying heat to the bottom of a cooking pot under and to and through the bottom of a heat permeable upwardly opening receptacle containing the waste and effecting substantial boiling and incineration of the waste, supplying preheated air into the receptacle, and compelling the vapor and products of combustion generated by the combustion heat to pass from the receptacle into a combustion zone under the receptacle and through the combustion heat into an afterburner flue leading from the combustion chamber. In the afterburner flue total conversion of vapor and products of combustion may be assured by effecting incandescent heating of a stack defining the flue. While accumulating a large volume of toilet waste in the receptacle, an aesthetically desirable and sanitary masking foam may be applied to the waste.

Other objects, features and advantages of the invention will be readily apparent from the following description of a preferred embodiment thereof, taken in conjunction with the accompanying drawings although variations and modifications may be effected without departing from the spirit and scope of the novel concepts embodied in the disclosure, and in which:

Figures 1, 2:
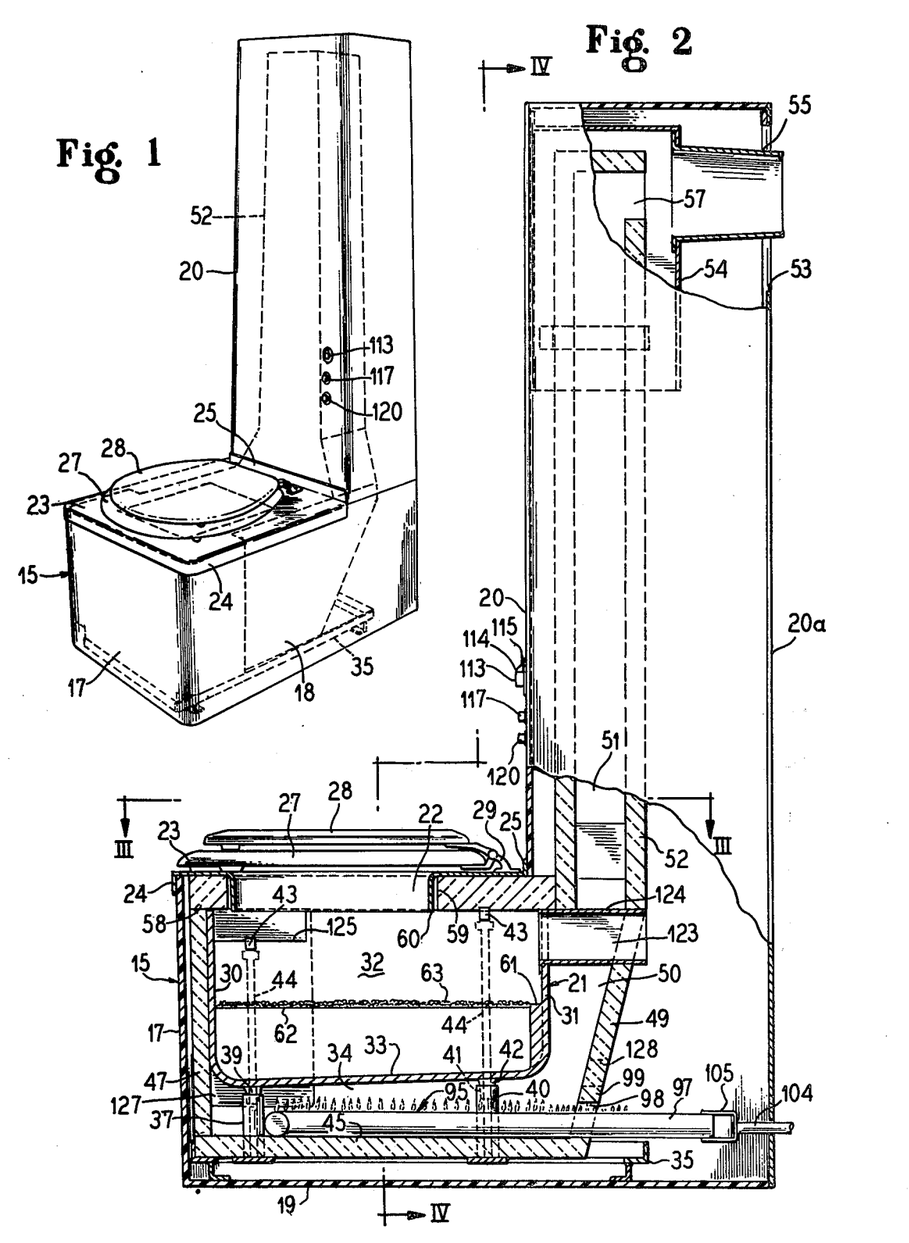
FIG. 1 is a perspective view of an incinerating toilet embodying features of the invention.
FIG. 2 is a side elevational view of the toilet shown in FIG. 1, with the parts broken away and in section for illustrative purposes.

In a preferred embodiment of a store and burn incinerating toilet for practicing the method of the present invention and as depicted in FIGS. 1 and 2, enclosing housing cabinet 15 is provided which may be formed from a corrosion resistant, high impact resistant and adequate temperature resistant moldable thermoplastic such as that identified as General Electric Lexan FL900 adapted to be formed by the process generally identified as "TSF" thermoplastic structural forming. The housing includes a front wall 17 opposite side walls 18 and a bottom wall 19. Offset rearwardly relative to the front wall 17 is an upward flue stack enclosing hood 20.

Housed within the cabinet 15 inwardly adjacent to the front wall 17 and between the side walls 18 is a heat permeable upwardly opening receptacle 21 into which deposits are made through an opening 22 in a deck 23 which preferably comprises a formed up sheet metal member such as stainless steel dimensioned complementary to and to be supported upon the upper edges of the front wall 15 and the side walls 18 in front of the lower end of the upwardly elongated hood 20. To maintain the deck member 23 oriented on the housing, a downturned perimeter flange 24 around the front and side edges of the member 23 is fixed about the outer sides of the top edges of the front and side walls of the housing. An upstanding finishing and curb flange 25 on the deck member 23 fits up against the lower end of the front wall of the hood 20. Any suitable means such as screws (not shown) may be employed to retain the deck member 23 in place but permitting removal of the deck member when desired. Supported on the deck member 23, properly oriented with respect to the receiving opening 22 is a toilet seat 27 and a seat cover 28 hingedly secured to the rear portion of the deck member 23 by means of customary hinge brackets structure 29.

Figure 3:
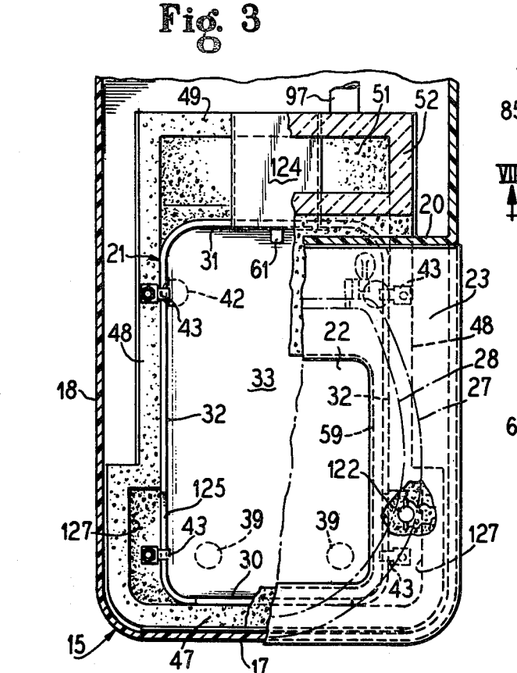
FIG. 3 is a top plan sectional view substantially along line III—III of FIG. 2.
Figure 4:
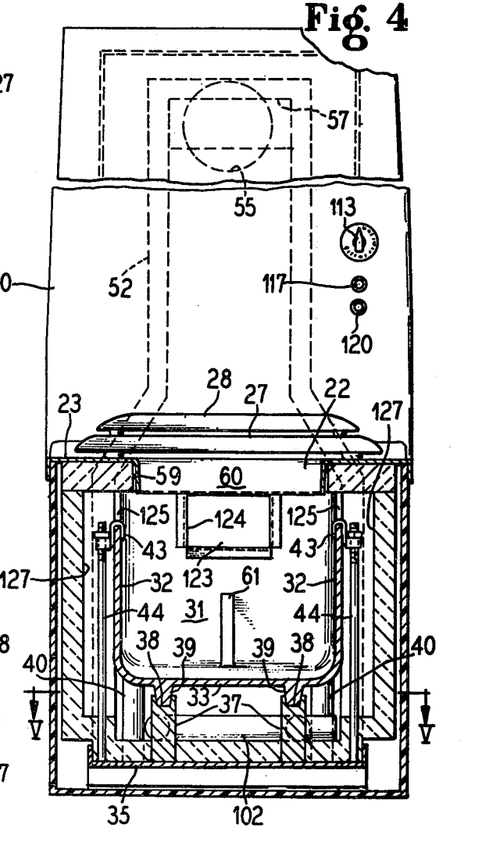
FIG. 4 is a front elevational sectional view taken substantially along the line IV—IV of FIG. 2.

In a preferred construction, the receptacle, which may also sometimes be referred to as a pot or retort is constructed as a cast stainless steel member having a front wall 30, a rear wall 31, opposite side walls 32 (FIGS. 2, 3, and 4) and a bottom wall 33 defining an upwardly opening accumulation chamber of generally front to rear elongated form. The bottom wall 33 slopes downwardly forwardly at a low angle.

To provide for a combustion zone chamber space 34 under the receptacle 21, means are provided for supporting the receptacle removably in spaced relation above the housing bottom wall 19, and in this instance comprising a metal frame 35 provided with a pair of laterally spaced supporting posts 37 having upwardly opening sockets 38 receptive of downwardly projecting integral boss legs 39 on the bottom wall 33 adjacent to the juncture of the front wall 30 with the side walls 32. An additional pair of laterally spaced upstanding posts 40 on the frame 35 provide upwardly opening sockets 41 receptive of downwardly projecting boss legs 42 on the bottom wall 33 adjacent to juncture of the side walls 32 with the rear wall 31. At suitable longitudinally spaced intervals the tops of the receptacle side walls 32 are engaged by hold down clamps 43 removably attached to the upper ends of upstanding anchor rods 44 carried by the frame 35.

Means defining a combustion chamber in heat transfer relation under the receptacle 21 comprise refractory heat insulation, preferably in the form of fiber ceramic, including a base panel 45 supported by the frame 35, in suitable combustion chamber spaced relation under the bottom wall 33 of the receptacle and in air space relation above the bottom wall 19. An upstanding front insulation panel 47 extends from the base panel 45 in air space relation to the housing front wall 17 and abuts the front wall 30 of the receptacle. Upstanding side insulation panels 48 extend from the base panel 43 and abut the major extent of the receptacle side walls 32 and lie in air space relation to the housing side walls 18. At their rear ends, the side insulation panels 48 join an upwardly and rearwardly oblique insulation panel 49 which is spaced rearwardly from the receptacle rear wall 31 to provide a rear upward extension 50 of the combustion chamber 34 to which the rear wall 31 is exposed in heat transfer relation.

At the upper end of the chamber extension 50 is the entrance into a flue 51 defined by a stack 52 formed from the same refractory heat insulation comprising high melting point (2300° F., 1360° C.) ceramic fibers having the capability in the appropriate thickness for the present purpose of about 1 in. (2.5 cm) of attaining incandescence at the surfaces exposed to combustion heat but containing the heat within the combustion spaces and maintaining an acceptably cool outer surface so that conduction cooling air or dead air spaces between the insulation and the housing casing will assure perfectly safe comfortable temperature condition on the outer surfaces of the housing. Heat transfer to the outer surfaces of the housing is further reduced by virtue of the housing being constructed from a poor heat transfer material. A substantially spaced relation is maintained between the stack 52 and the shroud or hood 20, and especially its removable rear wall 20a which extends in closing relation from the bottom wall 19 up to, or at least provides, an inlet opening 53 for entry of combustion and cooling air into the unit. A tubular draft shroud 54 is mounted in spaced relation about the upper portion of the stack 52. At its lower end the draft shroud 54 is open to receive cooling air and its upper end is closed with a laterally extending exhaust port extension 55 leading therefrom and projecting outwardly through the opening 53 to be coupled to a suitable stove pipe outside of the hood shroud 20 if necessary. Stack bracing means 56 may be carried by the shroud 54 which itself is suitably secured to inner side of the front wall of the hood 20. An exhaust port 57 opens from the upper portion of the stack 52 in alignment with the exhaust port extension 55. Through this arrangement, relatively cool air is drawn through the draft shroud 54 into and reduces the temperature of the clean flue gases issuing through the port 57. It may be observed that the cross-sectional flow area of the port extension 55 is substantially larger than the port 57 whereby to accommodate increased exhaust volume due to cooling air mixed with the exhausting combustion gases.

A thicker layer of refractory insulation 58 is supported across the upper edge of the receptacle 21 under the deck member 23. This insulation layer 58 may be of substantially the same material as the other insulation used to define the combustion chamber 34, 50 and the afterburner flue stack 52 but may be of a more porous or flocculent structure and about 1½ in. (3.71 cm) thick. A port hole 59 in the deck insulation 58 is aligned in slightly spaced relation to a down turned flange 60 of about the same width as the thickness of the insulation 58 and defining the receiving hole in the deck member 23 as well as providing a shield for the port 59 edge of the insulation 58. By having the depending shield or guard flange 60 as narrow as possible, i.e. only as wide as the thickness of the insulation layer 58, and extending substantially straight vertically, contamination likelihood is minimal.

During a service or accumulation or storage interval, the receiving opening 22 is adapted to remain open so that the toilet may be used in the customary manner, and without requiring flushing or burning after each use, until a sufficient accumulation in the receptacle 21 to warrant a burn cycle. For example, a 65 to 70 use load capacity may be provided for, or until the liquids and solids slush volume reaches a predetermined level as may be determined by a gauging device such as a vertical gauging rib (FIGS. 2, 3 and 4) on one wall within the receptacle 21 such as the rear wall 31 and rising from the bottom wall 33 to the maximum gauge height which may be visualized by looking through the opening 22. By way of example the level of waste material 62 is shown in FIG. 2 as close to the top of the gauge rib or column 61 indicating that a burn cycle should be initiated, although as a practical matter the load may be less, or even slightly greater at the time it is convenient to initiate the burn cycle.

During load accumulation, an aesthetically desirable and sanitary masking covering foam may be applied over the waste material 62. Such foam may be applied in any desirable manner such as by means for automatically injecting it onto the waste, but more economically may be applied manually from a suitable container such as a spray can from time-to-time as required to mask appearance and odor. A fairly stable but heat dispersible foam for this purpose may comprise a fatty acid soap composition including a holding agent such as zinc sulphate, a germicide and perfume. For convenience in application, the foaming compound may be supplied in a dispenser container pressurized by means of a conventional propellant such as aerosol, isobutane, propane or the like.

When it is desired to initiate a burn cycle, a first prerequisite is to place a safety porthole plug closure 64 (FIGS. 6, 7, 8 and 11) into closing and sealing relation to the receiving opening 22. For this purpose, the closure 64 comprises a preferably metal top panel 65 to which is attached a suitable outwardly projecting manipulating handle 67. Secured to the underside of the panel 65 is a generally pan shaped body 68 having its perimeter dimensioned to fit freely within the flange 22. Attachment of the body 68 to the panel 65 is by means of a lateral marginal flange 69 secured to the margin of the panel 65 which is dimensioned to overlap the deck member 23 about the opening 22. A suitable insulating gasket 70 is desirably attached to the underside of the flange 69 to provide a heat seal. Within the chamber provided by the body member 68 is contained suitable heat insulation 71. For retaining the closure against inadvertent displacement, one or more retaining fingers 72 are mounted on the bottom of the body 68 along one side edge to underlie the lower edge of the flange 60, and a latching manually operable slide bolt 73 is mounted within the body 68 to project at its opposite side through a hole 74 into a tubular socket 75 carried by the flange 60 and extending into and through the adjacent portion of the deck insulating panel 58. Support for the bolt 73 is provided by a guide tube 77 mounted by means of a bracket structure 78 suitably spaced under the top panel 65. Slidable manipulation of the bolt 73 is effected by means of an upwardly projecting manipulating handle projection 79 thereon extending through a gauging slot 80 of a length to limit retracted position of the bolt 73 with its outer end in clearance relation within the plane of the outer face of the closure side at the hole 74 and an opposite limit wherein the locking terminal of the bolt is at a suitable projected telescoped position within the socket 75. Access to the manipulating handle projection 79 through the top panel 65 is by way of an access opening 81 above the slot 80.

As a safeguard against opening the closure 65 after a burn cycle has progressed to a dangerous heat level within the receptacle 21, means comprising a heat responsive interlock are provided, conveniently comprising a safety closure plate 82 slidably supported as by means of brackets 83 on the underside of the top panel 65 normally adjacent to one side, herein the rear side of the access opening 81 and in clearance relation thereto, but heat responsively movable into blocking closing relation to the access opening 81. Heat responsive motivation of the plate 82 is effected by means of a bimetallic strip 84 centrally attached to the rear edge of the plate 82 and having its opposite end portions projecting freely slidably through respective apertures 85 in the bracket members 78. At room temperature, the bimetallic actuator 84 maintains the plate 82 in retracted position as indicated in dash outline in FIG. 6. When the temperature within the receptacle 21 reaches a predetermined degree such as about 200° F. (81° C.) the plate 82 will be moved by action of the bimetallic actuator 84 into fully interlocked position as shown in full outline in FIG. 6. This locked position will persist until the unit is cooled down to a safe temperature permitting the actuator to retract the plate 82.

In addition to its latching function, the bolt 73 serves to operate burner control circuit safety control means in the form of a normally open lock out switch 87 suitably mounted on a bracket 88 carried by the housing side wall 18 adjacent to the interlock socket tube 75. The switch 87 may be of a microswitch type provided with a spring actuating arm 89 having its distal end connected in suitably articulated relation to the outer end of an actuating plunger 90 which extends into the tubular socket guide 75 to be engaged by and projected toward the switch actuating arm 89 in the latching position of the bolt 73 and to be retracted by action of the spring arm 89 when the bolt 73 is withdrawn. As a result, the burner operating circuit will be automatically opened when the latch bolt 73 is retracted and will be automatically closed when the latch bolt is thrown into latching position.

Figures 9, 11:
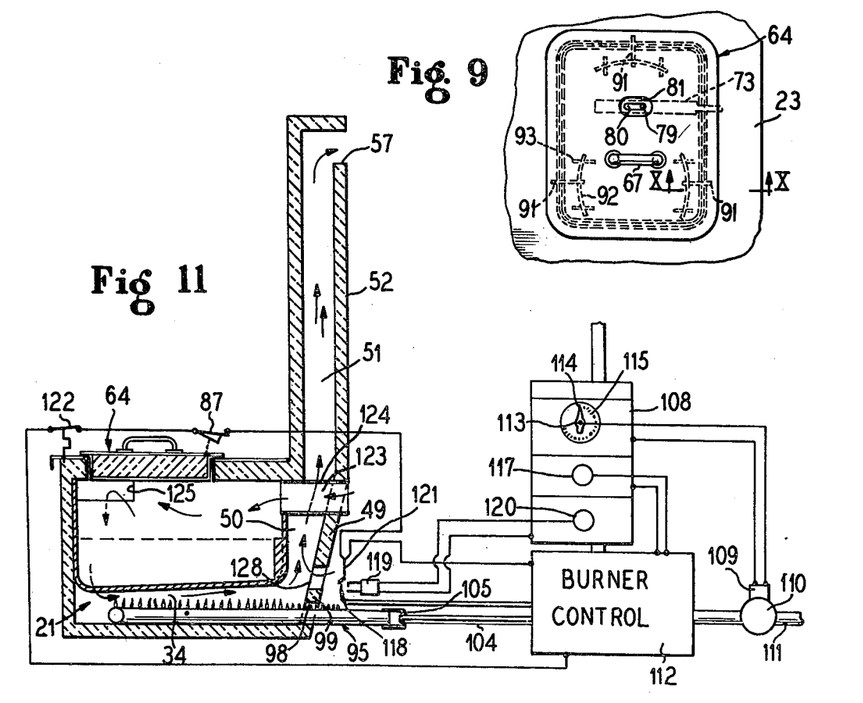
FIG. 9 is a more or less schematic fragmentary plan view of a modified deck closure arrangement.
FIG. 11 is a schematic view illustrative of operating details and controls for the incinerating toilet.
Figure 10:
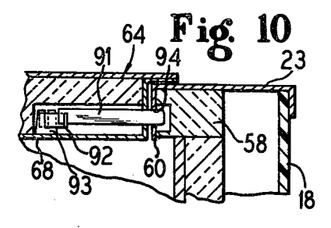
FIG. 10 is an enlarged fragmentary vertical sectional detail view taken substantially along the line X—X of FIG. 9.

In a modified arrangement as shown in FIGS. 9 and 10, function of the latch bolt 73 and its actuation may be the same as already described. However, instead of the safety locking or closure plate 82, the closure plug 64 may carry a plurality of automatically heat responsive interlock bolts 91 each of which is connected to a bimetallic strip actuator 92 mounted on brackets 93 carried by the upper surface of the closure body 68. Desirably there are three of the interlock bolts 91, one of each of which is located at each opposite side and at the rear of the closure member 64 and projectable from the respective side by action of the heat responsive actuator 92 to extend lockingly into a locking aperture 94 in the depending deck flange 60. Through this arrangement opening of the closure 64 can be effected only when the bolts 91 are retracted, even though the bolt 73 may be pretracted and the burner control circuit opened before the toilet unit has cooled down to a safe temperature.

Figure 5:
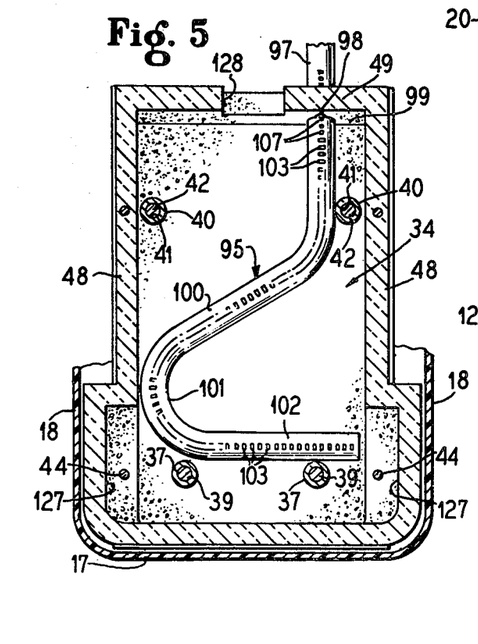
FIG. 5 is a horizontal sectional detail view taken substantially along the line V—V in FIG. 4.
Figure 6:
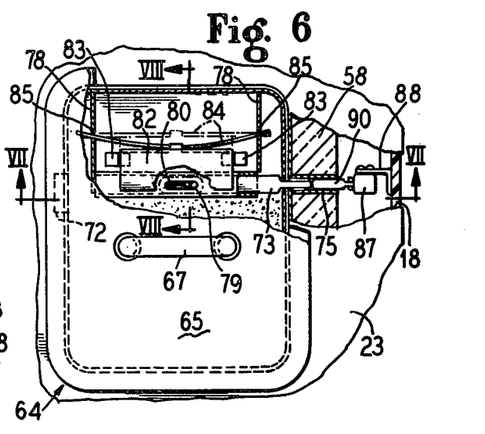
FIG. 6 is a fragmentary top plan view showing the deck port closure, partially broken away and in section for illustrative purposes.
Figure 7:
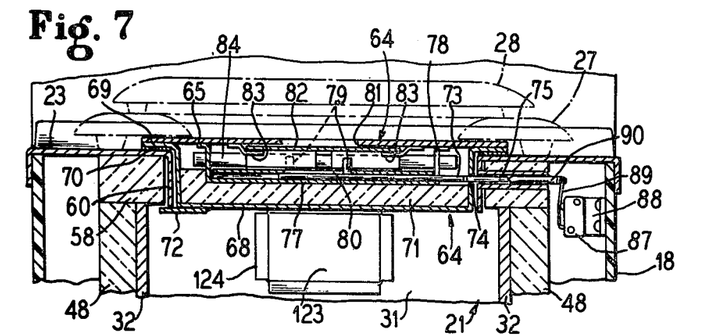
FIG. 7 is an enlarged fragmentary vertical sectional detail view taken substantially along the line VII—VII in FIG. 6.
Figure 8:
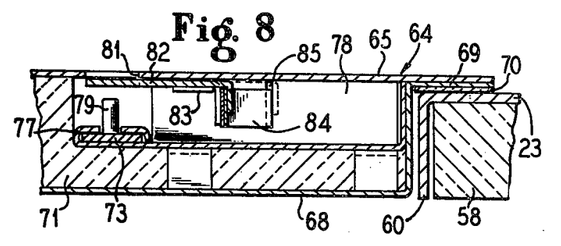
FIG. 8 is an enlarged fragmentary sectional elevational detail view taken substantially along the line VIII—VIII in FIG. 6.

To effect incineration of the waste 62 accumulated in the receptacle 21 incinerating heat is applied thereto within the combustion chamber 34 and its extension 50. A selectively operable heat producing device in this instance in the form of a gas burner 95 is disposed in the combustion chamber under the receptacle 21 and adapted to heat the bottom of the receptacle in substantially the manner of heating a cooking pot. In a preferred form, the burner 95 is of the so-called atmospheric burner type operating quietly at ordinary line pressure and comprises simply a hollow tube supported on the base insulation panel 45 with an outer end portion 97 extending outwardly through a generally upwardly elongated key hole slot 98 in a removable access door section 98 in the lower portion of the rear insulating panel 49 and adjacent to one side (FIGS. 2 and 5). For maximum incinerating flame production in a simple and efficient geometric configuration, the burner 95 is of a generally sinuous form having a generally diagonal section 100 extending obliquely from the inner end of the straight section 97 generally forwardly and from one side toward the opposite side under the bottom wall 33 of the receptacle 21 and joining a returned and curved section 101 leading into an elongated inner terminal transverse section 102 underlying the front portion of the bottom wall 33 at the deepest portion of the receptacle 21, that is where the deepest accumulation of slush waste is concentrated. Along the top of the tubular burner 95 is an array of flame orifices 103 of preferably equal size and in uniformly spaced series. At its inner end the burner is closed and at its outer end it is open and has coupled thereto the delivery end of a gas feeding duct 104 as by means of a generally U-shaped air gap spider 105 which maintains the delivery end concentric with the open receiving end of the burner section 97. In the portion of the burner section 97 which extends through the opening 98, a series of ignition flame orifices 107 leads to the start of the series of larger flame orifices 103. In a desirable arrangement, the number of flame orifices 103 in the extent from the inner end of the series of ignition orifices 107 to the center of the curved section 101 may be sufficient to generate about 32,500 BTU's in full operation of the burner, and the number of orifices 103 from the center of the section 101 to the end of the section 102 may be sufficient to produce about 22,500 RTU's, for a total of about 55,000 BTU's, adequate for complete incineration of an about 45 use load in about 1—½ hours, or a 65–70 use load in about 3 hours.

Means for controlling operation of the burner 95 comprise a simple electro-mechanical structure and circuit, best visualized in FIGS. 1, 2, 4 and 11. A timer 108 is electrically coupled with a valve actuator 109 which may include a solenoid for controlling a gas control valve 110 in a gas supply line 111 connected through a burner control unit 112 with the delivery duct 104. As a first step, of course, the closure plug 64 must be placed in closing position and the interlock switch 87 closed. Then the burner can be started by activating the timer 108 manually by turning a knob 113 until a pointer 114 thereon is set to the desired burn interval calibrated on a dial 115. This effects opening of the gas valve 110 which will be automatically closed when the timer runs out the set time interval. Opening of the valve 110 supplies the burner control. Then a pilot light switch button 117 is pressed to activate the burner control to supply a pilot light nozzle 118 with gas while a piezo electric pilot igniter 119 is activated by pressing in a control swich button 120. The pilot light switch button 117 is held in until a thermo-couple 121 is heated to activate the burner control to couple the gas delivery duct 104 with the supply conduit 111 to activate the burner 95 which will ignite from the pilot light through the ignition orifices 107 whereby the gas issuing through the flame orifices 103 is ignited. A suitably located normally closed thermally responsive safety switch 122 will open and stop the burn cycle if the temperature within the unit becomes excessive due to any possible malfunction or if the timer 108 has been set to maintain the burn cycle longer than necessary for complete incineration of the particular load.

Primary combustion air is, of course, supplied directly to the burner I95 at the spider 105. A greater volume of secondary combustion air is supplied through an air passage 123 in preheating relation to the combustion chamber, and more particularly the combustion chamber extension 50 by way of a duct 124 opening to atmosphere at the rear of the unit and communicating with the interior of the receptacle 21 through the upper portion of the rear wall 31. This secondary combustion air carries boiled off vapor from the receptacle 21 through means which will compel the vapor and any products of combustion generated in the receptacle to pass into the combustion chamber 34 and along the heat producing device, that is the burner 95, toward the flue 51. For this purpose the upper front portions of the receptacle side walls 32 have respective escape openings 125 which open into down draft passages 127 (FIGS. 3, 4 and 5) defined by respective offsets in the front portions of the insulation panels 48 and in cooperation with the front end portions of the receptacle side walls 32 below the spillover or escape ports 125. At their lower ends, the down draft passages 127 communicate with the front end portion of the combustion chamber 34 in the vicinity of the burner section 102 and forwardly from the burner sections 100 and 97. Conduction draft established by operation of the burner 95 causes the secondary combustion air drawn in through the passage 123 to sweep heat vaporized waste material from the receptacle 21 and through the ports 125 and passages 127 into the front end portion of the combustion chamber 34 and along the burner 95 across the rows of flames issuing from the ports 103 interposed in the path of movement of the convection current stream. The secondary air substantially promotes intensity of combustion and assures maximum conversion of the waste material into primary gaseous constituents. On reaching the combustion chamber extension 50, tertiary combustion air is supplied through inlt means such as a port or ports 128 in the lower portion of the back wall 49 and desirably immediately above the access panel portion 99. The air thus supplied plus whatever air may leak in through the burner clearance opening 98 intensifies combustion and improves convection draft toward and into the flue 51. Maximum efficiency is attained by having the inlet means 128 centered as low as practical at the entrance to the combustion chamber extension 50 and centered below the secondary air duct 124 which is located in the uppermost portion of the combustion chamber extension 50 where maximum secondary combustion air heating advantage is attained. It will be appreciated that as the combustion heat progresses upwardly during the burn cycle, resulting in proportionate increase in the convection velocity, substantially proportionate rate of secondary combustion air preheating is of substantial advantage in accelerating the rate of heat conversion of the waste materials in the receptacle 21.

A further important advantage of intensification of combustion in the combustion chamber extension 50 resides in the carryover afterburner effect in the flue 51. As a result of the intense combustion activity, the inner surfaces of the refractory stack 52 become incandescent and the upwardly flowing stream is subjected to intense reflected heat which completes reduction of any unburned constituents that may escape the combustion chamber. Upon reaching the discharge port 57 at the top of the stack, the effluent is in the form of odorless gas.

During progression of the burn cycle, there is initially boiling and driving off of the liquid waste. Inasmuch as the normal ratio of solids to liquid in toilet waste is in the range of one to four or one to six or about one pound of solids to four to six quarts of liquid there is a fairly prolonged interval of boiling in the receptacle 21 during a burn cycle during which there is a breaking down of the solids into a slurry of minutely sub-divided particles. Upon reaching a dry state, the solid waste reaches a flash point and there is then combustion directly in the receptacle 21 until the solid waste is entirely consumed. Such combustion is promoted and of improved efficiency due to the finely divided particulate nature of the solids resulting from the boiling.

According to automatic recorder performance chart statistics, during a burn cycle for incineration of the receptacle contents, there is a rapid initial increase in operating temperatures which is important to avoid stack exit odors at the start. About 1200° F. (648.5° C.) is reached very quickly, thus giving excellent odor control. The various parameters, including gas supply, flame orifice number and arrangement, primary, secondary and tertiary air supplies, location of the receptacle 21 relative to the burner 95, combustion chamber size and arrangement, afterburner flue length, and incandescence areas of the refractory liner, all contribute to attain a substantially uniform, stable result. As evaporation of the liquid waste increases, increased convection draws cooling air into the system, maintaining a fairly stable temperature which, if anything, decreases slightly during maximum boil-off. However, the combustion rate is readily controlled by adjustment of the fuel delivery to maintain the temperature sufficiently high to avoid stack exit odor. Therefore, during boil-off there is little temperature change and the system operates in a substantially stable condition. After evaporation is completed, and the solid combustible wastes have heated to their flash or ignition temperature, they ignite, but this does not appreciably raise the temperature in the system beyond an initial slight surge as ignition occurs. As the additional heat from the ignited waste material is added to the burner heat input, increased convection velocity causes increased air inflow through the secondary and tertiary inlets, wherein the secondary air inlet affords a generous air supply, and the tertiary inlet an ample but desirably more modulated air supply, maintaining a substantially uniform combustion temperature in the system without the necessity of modulating the fuel delivery to the burner 95. For example, efficient results are obtained where the cross-sectional flow area of the secondary air passage 123 is about 10 in$^2$ (65 cm$^2$), and the tertiary air inlet 128 is of a cross-sectional flow area of about 4 sq. in$^2$ (28 cm$^2$). In such a unit a desirable length for the flue 51 is about 37.25 in. (94.6 cm), with a cross-sectional flow area of about 15 sq. in$^2$ (97.5 cm$^2$).

If by the time all of the waste material has been burned out of the receptacle 21, the timer 108 has not run out and stopped the burn cycle, slight elevation of temperature in the unit will be detected by the safety switch 122 which will open and break the burner control circuit and stop the burn cycle. Thereupon, latent heat in the system will continue the convection circulation so that air drawn in through the secondary air inlet 123 and the tertiary air inlet 128 will accelerate cooldown. Then, when the heat sensitive, bimetallically actuated safety interlocks for the closure 64 have returned to inactive position, the closure can be removed from the receiving opening 22 and the toilet unit returned to active use.

An important advantage for compactness and economy as well as utility resides in the elimination of any need for a hopper to funnel waste material from the opening 22 into the receptacle 21. This eliminates a fault of most waterless type toilets and also the water washed conventional toilet hoppers which become unsanitary and often are contaminated with dry wastes or wastes that stubbornly adhere in spite of cleansing efforts. Herein the upper edges of the receptacle walls are contiguous the underside of the deck insulation panel 58 and the vertically extending deck flange 60 is merely a stiffening and insulation protecting guard flange defining the opening 22 and is virtually free from susceptibility of soiling. Surfaces within the receptacle 21 are automatically cleansed during the burning cycle. In this connection the front wall 30 serves an important function as a splash guard in avoiding, for example, urine contamination of the front insulation panel 47 which is thereby guarded against degredation from organic salts which would tend to destroy insulative qualities of the insulation. Although the side escape ports 125 are in the forwardmost portions of the side wall 32, these ports are located sufficiently laterally of the opening 22 and are high enough to avoid splash escape therethrough.

A valuable attribute of the fiber ceramic insulation directly exposed to the combustion chamber and the afterburner stack is that not only does it provide a highly efficient, lightweight refractory insulation, but because of its relatively rough surface, increased surface area is provided for incandescent radiation. Another advantageous feature of this insulation is that the relatively rough surfaces causes turbulent flow in the boundary layer as contrasted to laminar flow, which apparently improves mixing of the vapors and burning gases with the hottest combustion zone region toward the center of the combustion flow path or passageway through the unit, thereby contributing to the burn cycle efficiency.

It will be understood that variations and modifications may be effected without departing from the spirit and scope of the novel conecpts of this invention.

We claim as our invention:

1. A method of incinerating toilet waste, comprising:
   applying combustion heat in substantially the manner of applying heat to the bottom of a cooking pot under and to and through the bottom of a heat permeable upwardly opening receptacle containing the waste and effecting substantial boiling and incineration of the waste;
   supplying preheated air into said receptacle; and
   compelling vapor and products of combustion generated by said combustion heat to pass from said receptacle into a combustion zone chamber under said receptacle and through the combustion heat and into an afterburner flue leading from the combustion chamber.

2. A method according to claim 1, including applying said combustion heat by flame from an array of atmospheric gas burner orifices, and passing the vapor and products of combustion through the flames.

3. A method according to claim 1, comprising effecting incandescent heating of a stack defining the afterburner flue and thereby assuring total conversion of vapor and products of combustion to innocuous gas.

4. A method according to claim 1, including supplying additional combustion promoting air into the combustion chamber adjacent to the afterburner flue.

5. A method according to claim 1, wherein said afterburner flue extends vertically, and effecting cooling of an upper end portion of the flue and mixing cooling air with flue gases discharged from the flue.

6. A method according to claim 1, comprising supplying primary combustion air and gas to provide said combustion heat, supplying said preheated air as secondary combustion air, and supplying tertiary combustion air into the combustion chamber adjacent to passage of the vapor and products of combustion into the afterburner flue.

7. A method according to claim 1, comprising boiling the toilet waste in the receptacle for a substantial period of time in a vapor driving off phase during incineration and thereby breaking down solids in the waste into a slurry to promote combustion of the solids in the receptacle when the solids have dried out from application of the combustion heat.

8. A method according to claim 1, comprising prior to applying the combustion heat under the receptacle accumulating a large volume of toilet waste in the receptacle, and applying to the waste in the receptacle an aesthetically desirable and sanitary masking foam.

9. A method according to claim 1, comprising directly exposing to the interior of the combustion zone chamber substantially enclosing lightweight high melting point ceramic fiber refractory material, and in the afterburner flue directly exposing lightweight high melting point ceramic fiber refractory material to a passage defined by a stack in said flue.

10. A method according to claim 1, comprising lining the combustion zone chamber with high melting point fibrous ceramic insulation having relatively rough surfaces directly exposed to the combustion zone chamber, heating said surfaces to incandescence, subjecting the vapor and products of combustion passing through the combustion zone chamber to incandescent radiation, and effecting turbulence of the products of combustion and vapor at the boundary layer of the rough incandescing surfaces.

* * * * *

UNITED STATES PATENT AND TRADEMARK OFFICE
CERTIFICATE OF CORRECTION

PATENT NO. : 4,138,331
DATED : February 6, 1979
INVENTOR(S) : Frankel, et al

It is certified that error appears in the above—identified patent and that said Letters Patent are hereby corrected as shown below:

Column 1, line 45 for "water" read "wastes".

Column 7, line 13 for "RTU's" read "BTU's".

Column 8, line 18 for "inlt" read "inlet".

Signed and Sealed this

Twenty-fifth Day of September 1979

[SEAL]

Attest:

LUTRELLE F. PARKER
Attesting Officer      Acting Commissioner of Patents and Trademarks